United States Patent
Tillaart et al.

[11] Patent Number: 5,459,952
[45] Date of Patent: Oct. 24, 1995

[54] APPARATUS FOR DIGGING AND TRANSPLATING TREES

[75] Inventors: Marlin Tillaart; Martien van Denoever, both of Brougham, Canada

[73] Assignee: Dutchmaster Nurseries Ltd., Brougham, Canada

[21] Appl. No.: 226,080

[22] Filed: Apr. 11, 1994

[51] Int. Cl.⁶ .......................... A01G 23/04; A01C 11/00
[52] U.S. Cl. ................... 37/302; 111/101; 414/23
[58] Field of Search ................... 37/302, 303, 333, 37/334, 335; 172/1, 88, 101; 414/23, 687

[56] References Cited

U.S. PATENT DOCUMENTS

| | | | |
|---|---|---|---|
| 3,017,707 | 1/1962 | Sigler et al. | 37/302 X |
| 3,017,719 | 1/1962 | Sigler et al. | 47/58 |
| 3,032,368 | 5/1962 | Sigler et al. | 296/3 |
| 3,191,982 | 6/1965 | Goalard | 294/70 |
| 3,558,177 | 1/1971 | Snead | 294/70 |
| 3,713,995 | 1/1973 | Grover et al. | |
| 3,775,876 | 12/1973 | May. | |
| 4,031,637 | 6/1977 | Stocker. | |
| 4,211,020 | 7/1980 | Holckamp | 37/334 |
| 4,226,033 | 10/1980 | De Haan. | |
| 4,286,398 | 9/1981 | Lemond et al. | |
| 4,341,025 | 7/1982 | Stocker. | |
| 4,351,253 | 9/1982 | Dahlquist | 111/2 |
| 4,402,148 | 9/1983 | Schiffelbein | 37/195 |
| 4,403,427 | 9/1983 | Dahlquist. | |
| 4,604,017 | 8/1986 | Boehm | 414/23 |
| 4,625,662 | 12/1986 | Heinzen | 111/2 |
| 4,979,321 | 12/1990 | Hall. | |
| 5,081,941 | 1/1992 | Weeks | 111/101 |
| 5,129,336 | 7/1992 | Vos | 111/101 |

Primary Examiner—Randolph A. Reese
Assistant Examiner—Robert Pezzuto
Attorney, Agent, or Firm—Ridout & Maybee

[57] ABSTRACT

Apparatus for digging and transplanting trees and the like comprises a horizontal frame to which a plurality of sliding spade assemblies is mounted, each comprising a spade blade, a thrust tube secured to the blade and a slide housing, also secured to the blade, which surrounds a portion of the outer surface of the thrust tube. The tower is received within a channel between the thrust tube and the slide housing, so that the spade assembly may be reciprocally moved along the tower with the blade supported both inside and outside the tower for improved stress distribution and durability. The bearing surfaces of the tower and the slider are provided with linings of plastic to minimize frictional resistance.

8 Claims, 9 Drawing Sheets

APPARATUS FOR DIGGING AND TRANSPLATING TREES

BACKGROUND OF THE INVENTION

This invention relates to hydraulically powered apparatus for digging and transplanting trees and the like, and more particularly to a vehicle-mounted apparatus in which reciprocating blade assemblies mounted to a horizontally disposed frame include an improved arrangement of means for guiding and firmly supporting the spade blades as they penetrate the soil.

There are many transplanting devices commercially available to nurserymen, of the kind in which an assembly of reciprocating blades is adapted to converge into the ground surrounding the plant so as to form a "rootball", a well-formed excavated portion of the roots together with the earth in which they are imbedded. The plant, transported with its rootball intact, may continue to receive nourishment until it is replanted. If the plant is to be moved to a distant location, the rootball may first be freed from the transporting device and placed into a burlap-lined wire basket.

It has been recognized that the very substantial bending stresses to which the blades of a transplanting device of this kind are subject can result in failure of the blades to converge properly and provide an intact rootball about the plant. Flexing of the blades and stresses on their associated support can also lead to wear, jamming or break-down of the mechanism.

Various expedients have been adopted in transplanters known to the prior art which are intended to compensate for the stresses encountered by digger blades. For example, the prior device disclosed in Grover U.S. Pat. No. 3,713,234 employs a tubular tower (guide tube) and a thrust tube telescopically enveloping the tower for directing the blade along the desired path. However, the arrangement of bolting the blade to the outside of the thrust tube cannot afford satisfactory bracing against the radially outwardly directed forces tending to spread the digger blades. Moreover, the shaping of the blades themselves in the Grover device includes a flat central portion inherently susceptible to the radially outward flexing forces and not adapted to form a rounded rootball for placement into conventional baskets, which typically are 15 inch diameter and circular at the bottom.

Other prior art devices employ more complex guiding and alignment mechanisms operatively connecting the reciprocating blade to the tower along which its path is determined, for example LeMond U.S. Pat. No. 4,286,398 (rollers mounted in housing) and Stocker U.S. Pat. No. 4,341,025 (rack-and-pinion). These are also subject to failure and misalignment arising from these "spreading" force on blades convergingly penetrating the earth and, additionally, tend to jam or to require frequent removal of dirt and debris entering the blade guiding mechanisms in use.

The problem of binding and jamming because of obstruction of mechanisms by debris has been the particular focus of other prior art devices, for example Weeks U.S. Pat. No. 5,081,941 which discloses an assembly of arcuate converging towers along each of which a slide assembly moves, a blade being affixed to the outside of the slide assembly. The slide assembly includes a housing adapted to slide along the tower on an arrangement of plastic weir pads and brass weir pads intended to provide lower friction, deformable sliding surfaces. Again, however, the blades are affixed only to corresponding outer surfaces of the sliding members, so that much of the bending stress encountered in use is borne by the blades themselves and by hydraulic cylinder linkages to the slide assembly.

It is also typical of the aforementioned and other like devices in the prior art that the portion of the blade which is positively supported against lateral movement and flexion is considerably shorter than the "free" lower portion which enters the ground. Typically, a 4 ft. long spade is supported at its upper end by only about 1 ft. of "anchor". In the result, a relatively small angular deflection at the tip of a blade in use translates to a considerable flexing force over the short supported portion, leading to misalignment and jamming of the mechanism.

SUMMARY OF THE INVENTION

It is therefore a general object of this invention to provide an improved apparatus for digging and transplanting trees and other plants which is durable, compact and adapted for use with any conventional truck, tractor, loader or vehicle used in transplanting operations.

A further object of the invention is to provide such digging and transplanting apparatus having new and improved means for attaching and guiding the spade blades thereon using a tower having a U-shaped channel cross-section and a sliding blade assembly operable to move along the tower that distributes the digging forces imposed on the spade blades over both the inside and the outside of the tower.

A further object of the invention is to provide such digging and transplanting apparatus in which the stress-bearing sliding surfaces between the tower and the sliding blade assembly are lined with a high molecular weight, low-friction plastic material for smooth operation.

A further object of the invention is to provide such digging and transplanting apparatus having blades formed with a central longitudinal fold line which adds resistance to deformation of the blade in use and having a curvature which decreases with lateral distance from the fold line, which helps to form a well-shaped rootball for placement in a conventional basket.

A further object of the invention is to provide such digging and transplanting apparatus in which the length of the upper stem portion of a spade blade is fully supported from inside and from outside the tower channel and is comparable in length to the length of the lower digging portion of the spade blade entering the ground at its maximum digging capacity in excavating a rootball.

A further object of the invention is to provide such digging and transplanting apparatus in which either three towers and associated sliding blade assemblies or four towers and associated sliding blade assemblies are mounted to a horizontally disposed frame.

A still further object of the invention is to provide such digging and transplanting apparatus in which the towers guiding the reciprocating motion of associated blade assemblies are positioned on the inside of a horizontally disposed frame, or on the outside of a horizontally disposed frame.

With a view to overcoming the aforementioned disadvantages of prior art transplanting apparatus and to achieving the stated object, an apparatus for digging and transplanting trees and the like according to one embodiment of the invention comprises a multi-sided frame for encircling the tree to be transplanted when disposed horizontally to the ground. Mounted on the frame and extending angularly upwardly therefrom is a plurality of towers, each of which is in the form of a first channel open along one side, preferably a U-shaped channel. Associated with each of the towers is a removable sliding spade assembly, including a spade blade having a lower digging portion and an integral upper stem portion of generally the same length, a hollow thrust tube welded along one side thereof centrally to the stem portion of the spade blade, the thrust tube being of a cross-sectional shape for accommodation within the open channel of the tower, and a slide housing in the form of a second, larger channel which embraces a portion of the length of the thrust tube in space relation thereto and is welded along the open side of the second, larger channel to the stem portion of the blade, so that a sliding spade assembly channel is formed between the thrust tube and the slide housing for telescopically receiving the tower for reciprocating movement of the sliding spade assembly relative thereto. Where the tower and the slide housing are both square U-shaped channels, the sliding spade assembly channel defined between them will also be of a rectangular U-shape. The apparatus includes power means for actuating the sliding spade assembly for reciprocating movement along the tower, which preferably includes hydraulic actuating means located in the hollow interior of the thrust tube, operatively connected to the top of the thrust tube and to the tower at a position below the frame.

BRIEF DESCRIPTION OF THE DRAWINGS

Other objects and advantages of the invention will be readily appreciated by reference to the description which follows of certain preferred embodiments thereof, when considered in light of the accompanying drawings, in which like reference numerals designate similar components. In the drawings.

DESCRIPTION OF THE PREFERRED EMBODIMENT

According to the present invention, a hydraulically-powered sliding spade assembly runs along each of a plurality of towers disposed at an angle to a horizontal tower-mounting frame. Each sliding spade assembly comprises a spade blade, a thrust tube secured to the spade blade and a slide housing, also secured to the blade, which surrounds a portion of the outer surface of the thrust tube and is of a dimension such that a channel is defined between them to receive the tower.

The tower has a cross-sectional contour adapted to be received within the sliding spade assembly channel, so that in its motion along the tower the blade is supported both inside and outside the tower for superior stress distribution and durability. The bearing surfaces of the tower and the slider are provided with linings of plastic to minimize frictional resistance of the sliding spade assembly channel walls against the tower.

Figure 1:
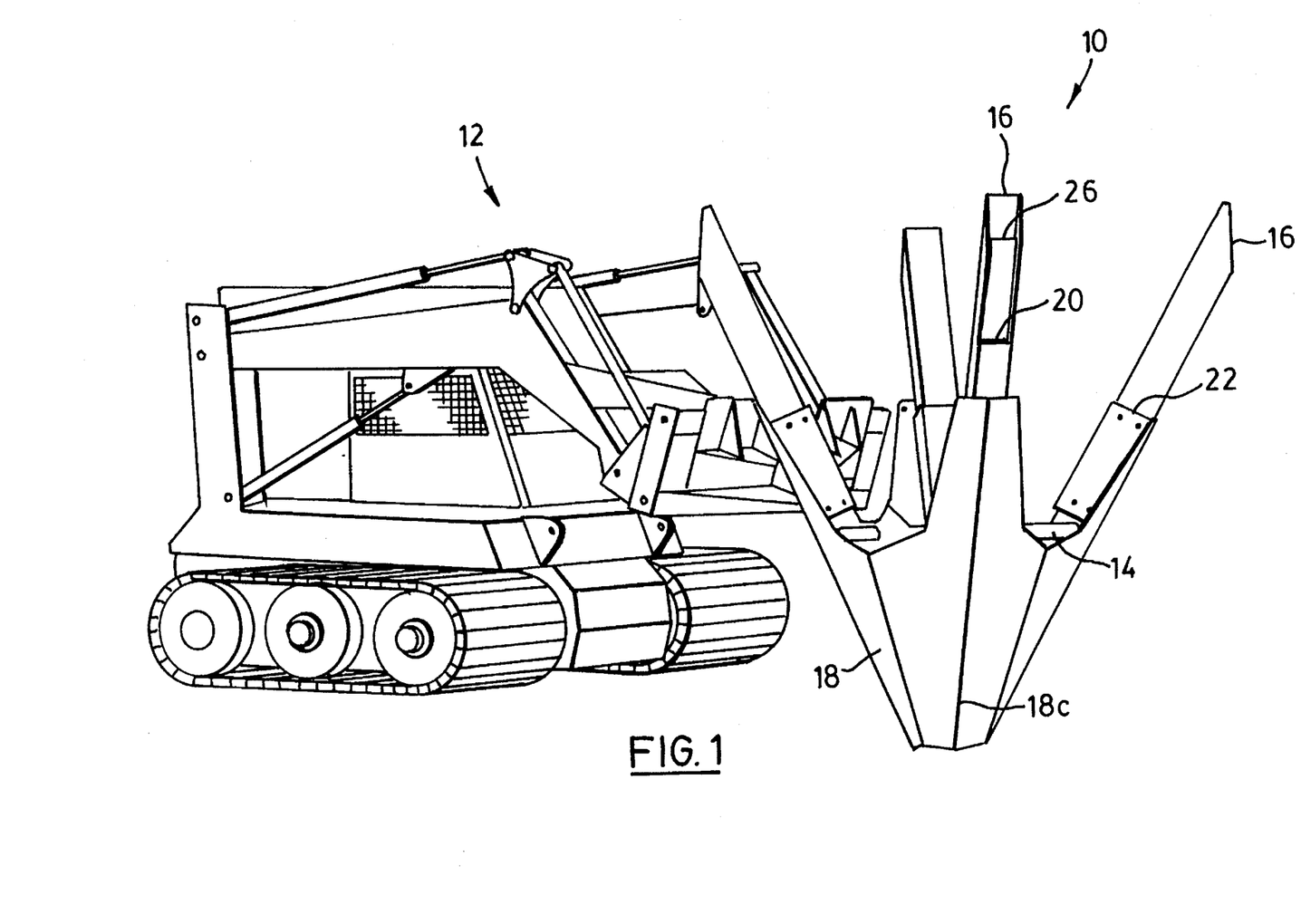
FIG. 1 is a perspective view of an embodiment of tree digging and transplanting apparatus according to the present invention, in which four spades are mounted to an inside frame, the apparatus being shown mounted to a vehicle.

FIG. 1 illustrates an apparatus according to the invention for digging and transplanting trees, indicated generally at 10, which is operatively attached by conventional mechanical and hydraulic line connections to a vehicle 12 for elevating and lowering the apparatus. All of the hydraulic cylinder mechanisms utilized in apparatus 10 will also be understood to have suitable hydraulic line connections for operation of the apparatus.

Figure 2:
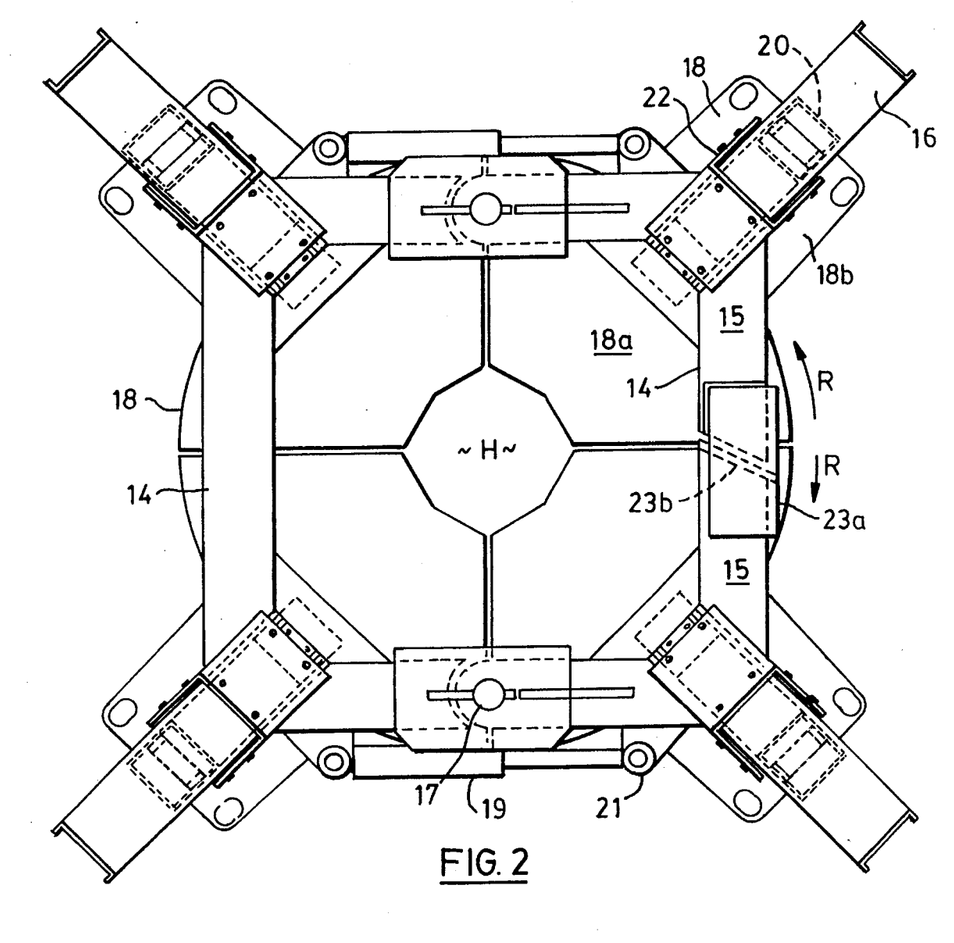
FIG. 2 is a top view of the four-spade digging and transplanting apparatus of FIG. 1.

The embodiment of apparatus 10 particularly depicted in FIGS. 1 and 2 is a four-spade digger with an inside frame. Mounted to the corners on the outside of a square frame 14 are four downwardly-converging spade towers 16 along which four respective sliding spade assemblies are guided in use, to extend and retract the four spade blades 18 as discussed in greater detail below.

The tower-mounting frame of the apparatus should be capable of opening apart when the spade blades are retracted, for positioning the apparatus, and then locking shut to surround the hole of a tree. In the four-spade digger of FIG. 2, frame 14 incudes two pivotable gate sections 15 each of which may be pivoted open about axis 17, in the sense of arrows R, upon actuating retraction of hydraulic gate cylinders 19, each connected at its ends to a gate section and a stationary section of frame at support pins 21. When the frame is in the closed configuration of FIG. 2, the gate sections 15 are reversibly locked shut by suitable means such as locking plate 23a and lock stopper 23b.

Figure 2A:
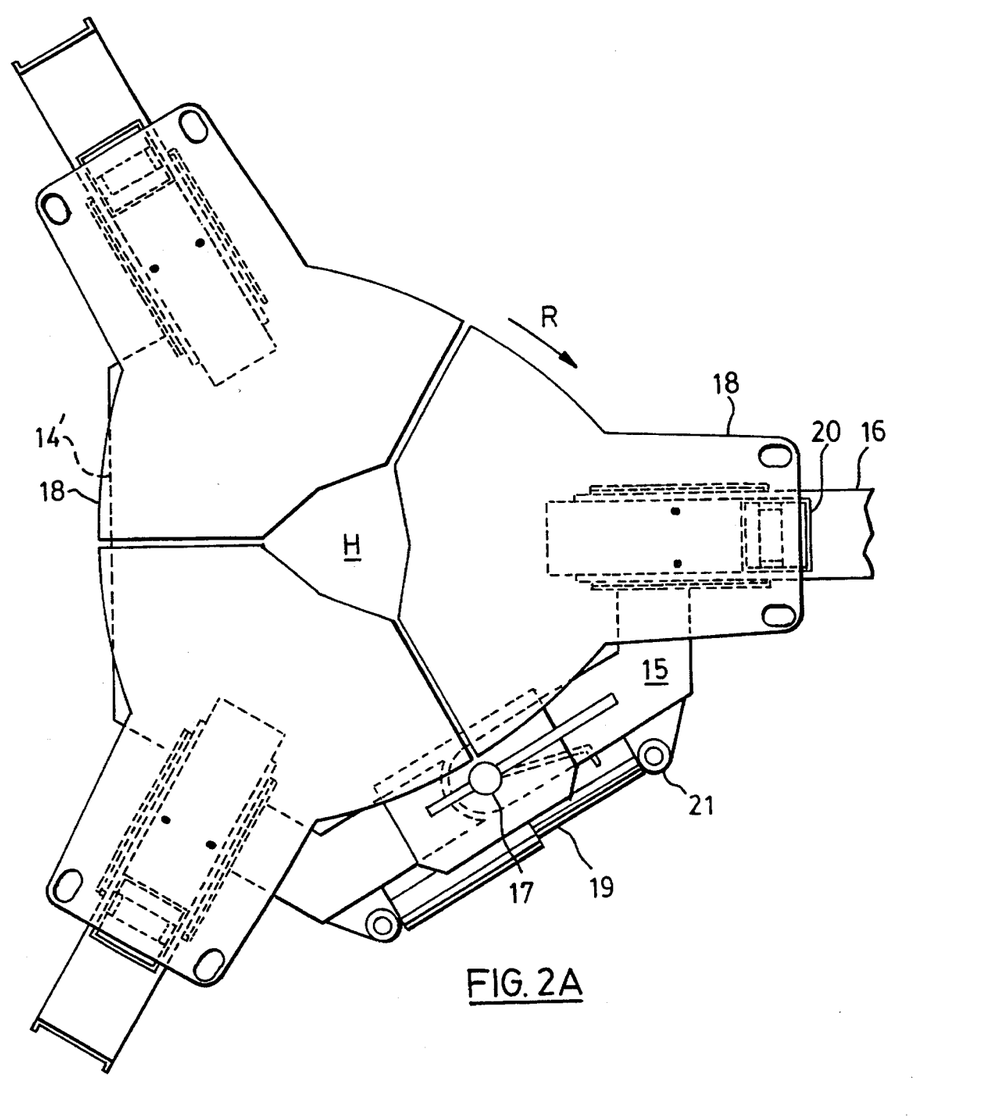
FIG. 2A is a top view of a second embodiment of tree digging and transplanting apparatus according to the present invention in which three spades are mounted to an outside frame.
Figure 2B:
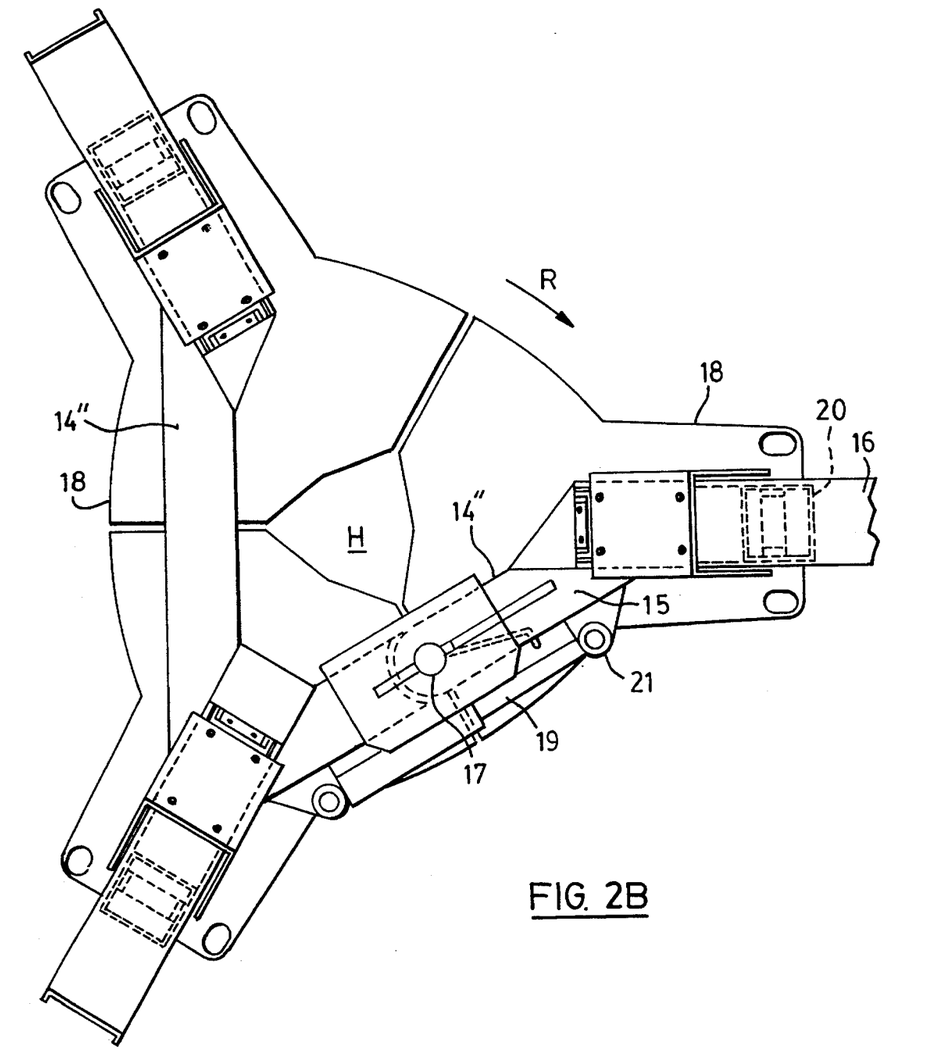
FIG. 2B is a top view of a second embodiment of tree digging and transplanting apparatus according to the present invention in which three spades are mounted to an inside frame.

The plurality of towers associated with the sliding spade assemblies may alternatively be three towers mounted to a generally C-shaped outside frame 14' as in FIG. 2A or three towers mounted to a generally V-shaped inside frame 14" as in FIG. 2B. With an inside-frame arrangement, towers 16 may be made relatively short, permitting efficient excavation of a small-radius rootball.

All components, other than the differently configured frames 14, 14' and 14", having similar structure and function are given like reference numerals. In both of the tower/three-spade arrangements there is only a single pivotable gate section 15, openable in the sense of arrow R to receive the bole of the plant to be excavated.

The present invention is, however, not limited to a particular construction of horizontal tower-mounting frame, as the improved structure and relationship of the towers and associated sliding spade assemblies which is common to all embodiments of apparatus according to the present invention, whether they are three- or four-spade configurations or inside- or outside-frame arrangements. Accordingly, the following discussion of the tower/spade arrangement is made for convenience with reference to drawing FIGS. 1, 2, 3, 4, 5 and 6 relating to a four-spade inside-frame digger. The principles of operation and advantages are the same for like-numbered components of the tower and spade assemblies in FIGS. 2A and 4A which show the arrangement of frame and blade assemblies in an embodiment of the apparatus having three spades mounted to an outside frame 14', and in FIG. 2B which specifically relates to apparatus having three spades mounted to an inside frame 14".

With reference to FIGS. 1, 3, 4, 5 and 6 it will be seen that in the preferred form of sliding blade assembly blade 18 comprises a lower digging portion 18a and an integral upper stem portion 18b of comparable length. A linear thrust tube 20, preferably square in cross-section is welded along substantially its full length on parallel edge lines 20a and 20b to upper stem portion 18b of the blade. A U-shaped slide housing 22 of larger interior dimensions than the outer dimensions of square thrust tube 20 is welded along opposite edges 22a and 22b to the stem 18b of blade 18, so that a U-shaped sliding spade assembly channel 24 is defined between the outer surfaces of the thrust tube 20 and the inner faces of the slider housing 22.

Figure 4:
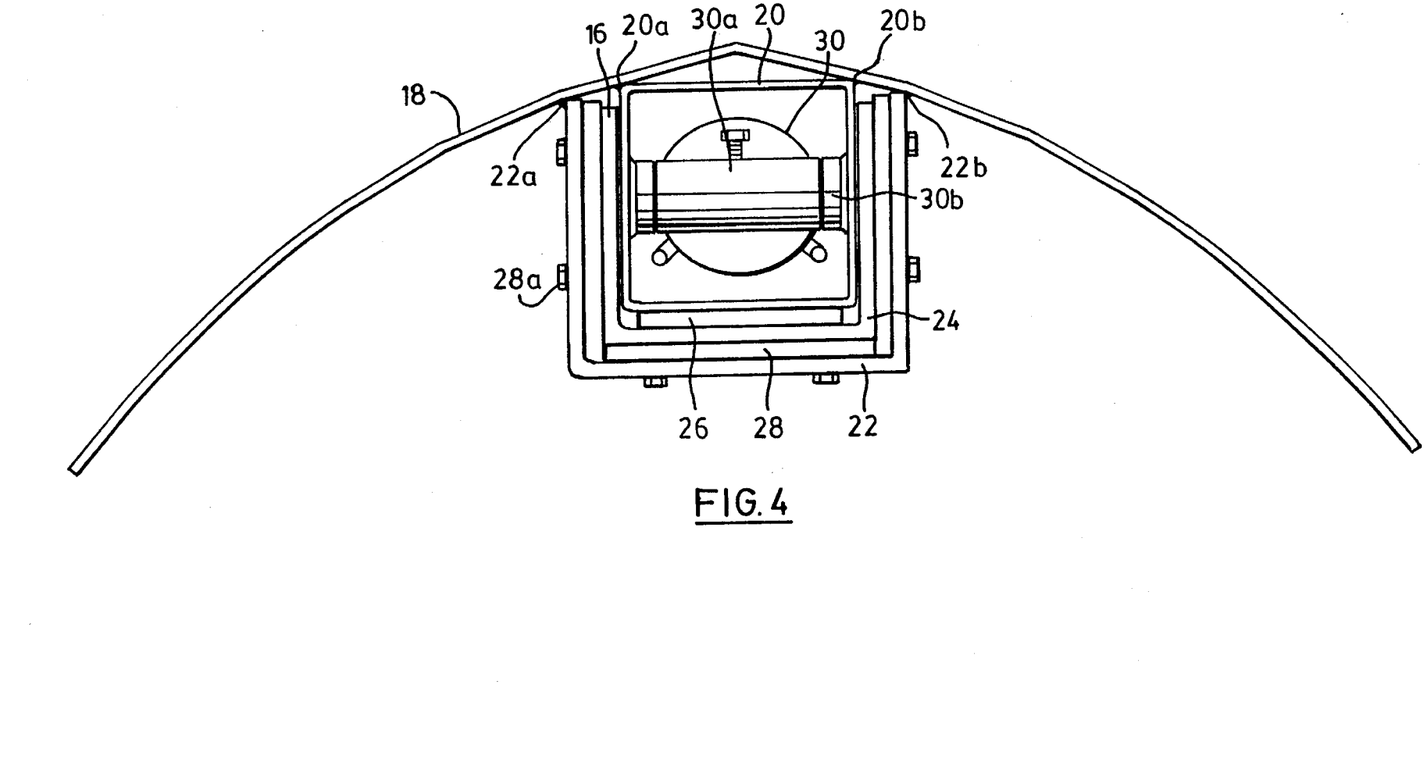
FIG. 4 is a view of the tower and sliding spade assembly of FIG. 3 from the top end of a tower and axially therealong in the direction indicated by arrow T in FIG. 3.

The thus-assembled blade 18, thrust tube 20 and slide housing 22, together with friction-reducing plastic pads 26 and 28, make up a sliding blade assembly. Tower 16 is formed as a rectangular channel with a U-shaped cross-section such that it fits within the sliding spade assembly channel as the sliding spade assembly is powered along the tower. As best seen in FIG. 4, providing an axial view from the top of a tower and associated sliding blade assembly in their operating position, sliding spade assembly channel 24 closely accommodates U-shaped tower 16, friction-reducing plastic pad 26 affixed to the longitudinal inner surface of tower 16 by countersunk anchor bolts (not shown) and friction-reducing plastic pads 28 removably secured to the three interior surfaces of slide housing 22 by anchor bolts 28a.

Each sliding spade assembly is pulled down the tower in digging by powered retraction of hydraulic cylinder 30 which is coaxially positioned within the sliding spade assembly channel, being connected at its lower end to cylinder support pin 30a affixed to tower 16 at a position below the horizontal tower-mounting frame 14 and at its upper end to a cylinder bushing 30b centrally fixed at the top of thrust tube 20.

Over the length of the slide housing 22, it will be seen that the upper stem portion of the blade 18b is fully supported against spreading forces transmitted by the lower digging portion 18a both inside the tower channel, by the thrust tube 20 welded to the blade stem and on the outside surface of the tower by the U-shaped slide housing which surrounds the tower, 16 and is also welded to the blade stem. The side walls of tower 16 defining the channel therealong are thus prevented from spreading apart, by the surrounding slide housing 22, and from collapsing together, by the presence of thrust tube 20 within the tower channel, to maintain alignment and smooth operation.

Additionally, because the length of support on both sides of the tower is approximately equal to the distance that the digging portion of the blade 18a goes into the ground, the problem of blade spreading and consequent misalignment is greatly reduced.

The in-tower arrangement of hydraulic cylinders 30 brings the line of action of the cylinder as close as possible to the line of action of spade itself, again minimizing distortional forces encountered when a blade goes angularly into the ground. Stress on the U-shaped tower 16 is also reduced by having the bottom of the cylinder 30 connected to the tower at a location below the horizontal frame 14 of the digging apparatus 10. Additionally, placement of the hydraulics inside the tower affords a measure of protection from the elements and foreign objects.

Blade 18 is preferably convexly curved and formed with a central fold line 18c, thereby to impart additional strength and resistance to outwardly directed spreading forces on the blades as they enter the ground. As best seen in FIGS. 2, 2A, and 2B, the central folding along the length of blades 18a results in more curvature to the perimetrical contour of the region H circumscribed by the blade cutting edges at their fully extended position, resulting in a better-formed more rounded rootball for placement in a conventional basket. It is also preferred that the degree of convex curvature of the blade 18 decrease with increasing distance from central fold line 18c, which results in the formation of a rootball which is well rounded at both the bottom and the top thereof.

When the hydraulic connections are undone, each sliding spade assembly may conveniently be removed from its associated tower by pulling the assembly up and off the tower, as by a pulling chain looped through disassembly holes 25 formed in the blade stem.

Figure 3:
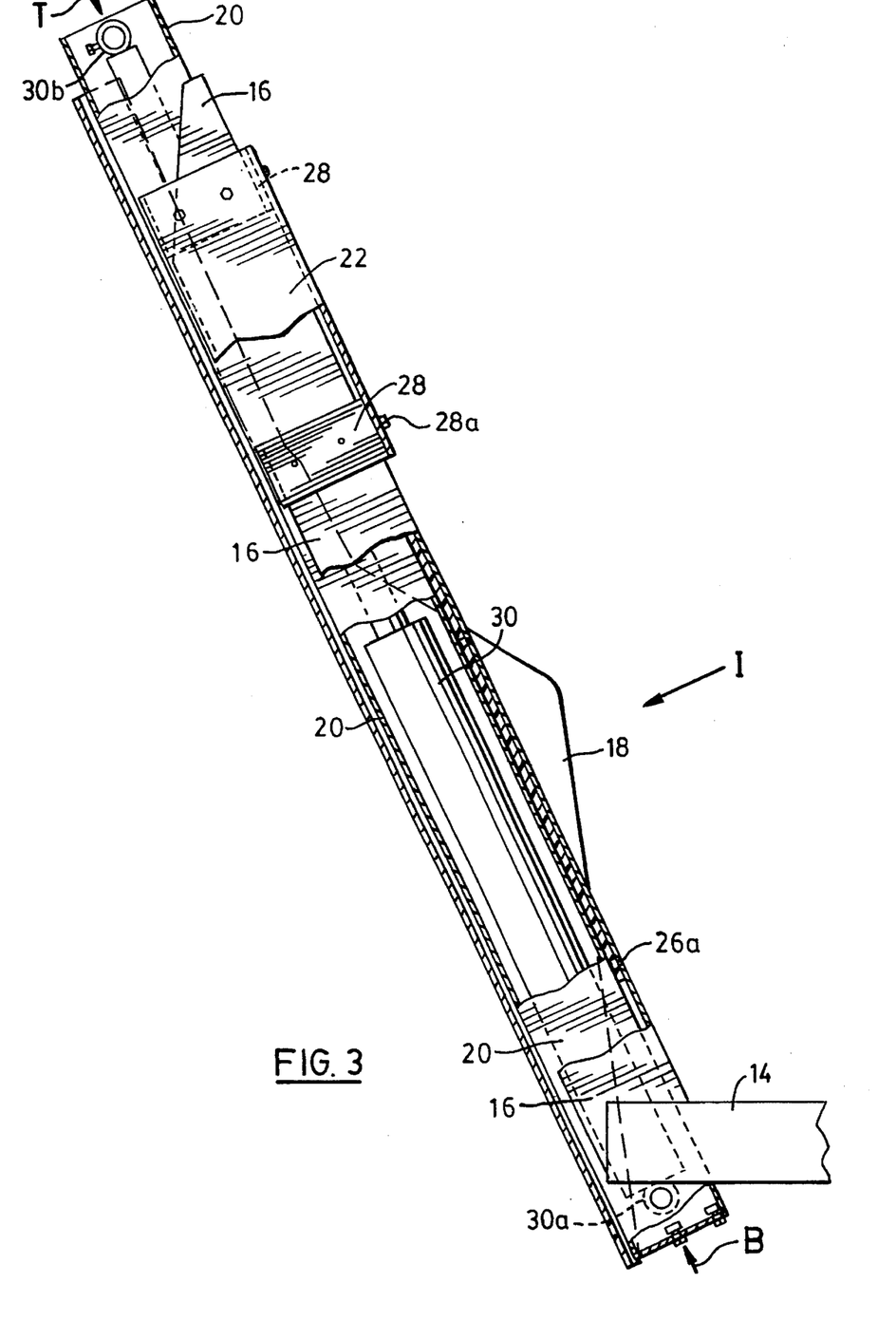
FIG. 3 is a side elevational view of any one of the towers and its associated sliding spade assembly, in those embodiments of the invention in which the spades are mounted to an inside frame, as in the four-spade apparatus of FIG. 1 and FIG. 2 or the three-spade apparatus of FIG. 2B.
Figure 4A:
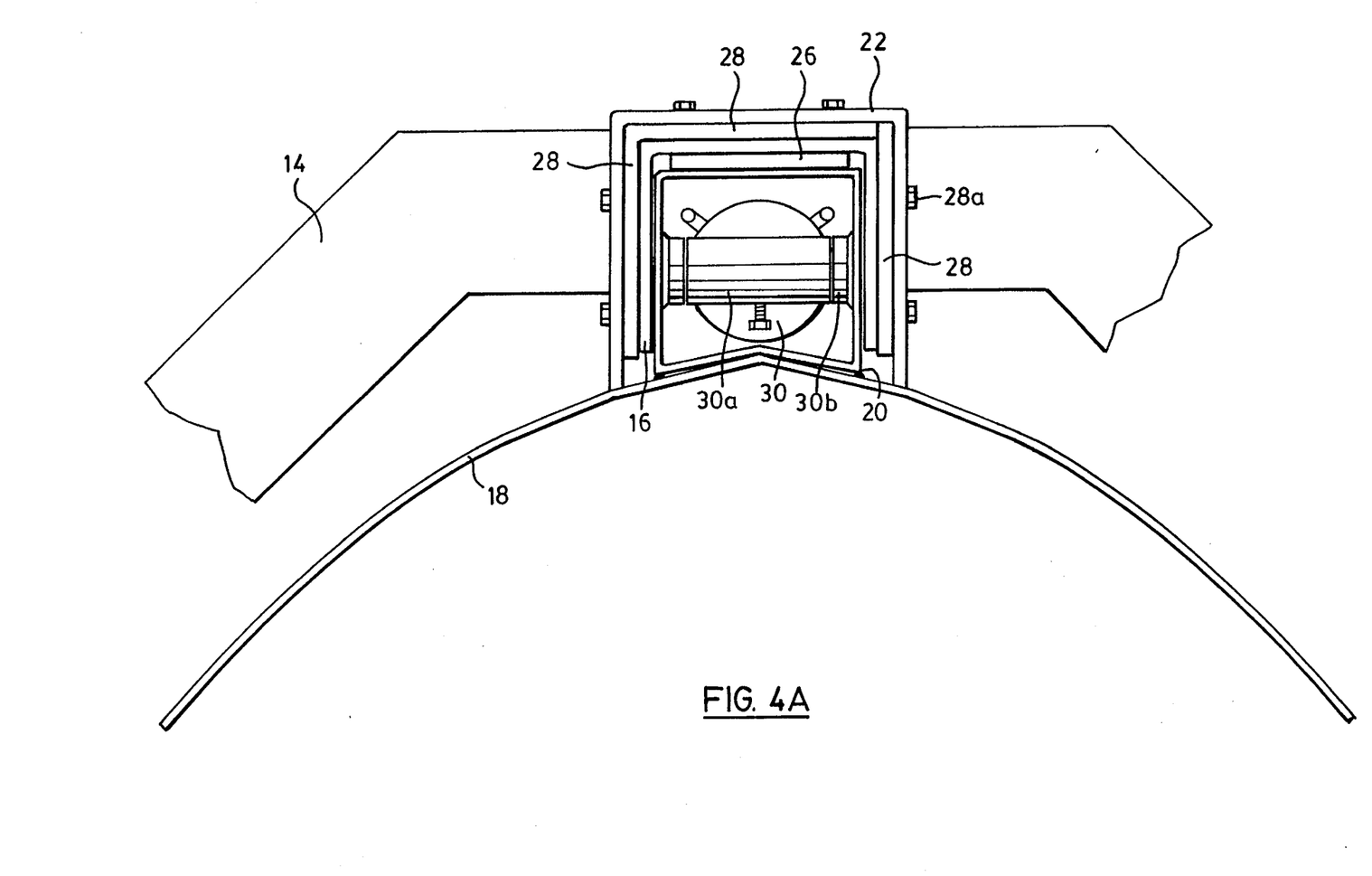
FIG. 4A is a view of the tower and sliding spade assembly from the top end of a tower and axially therealong in the three-spade, outside frame apparatus illustrated in FIG. 2A.
Figure 5:
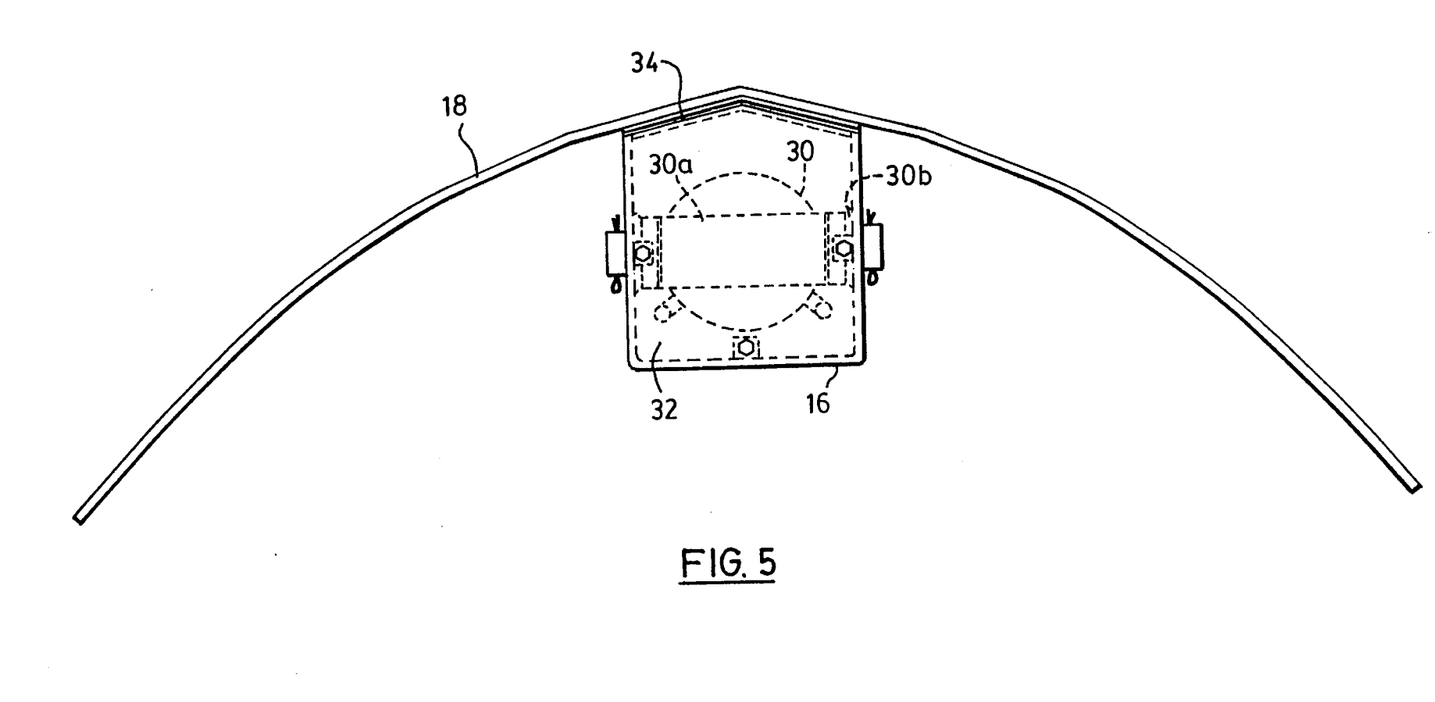
FIG. 5 is a view of the tower and sliding spade assembly of FIG. 3 from the bottom end of a tower and axially therealong, in the direction indicated by arrow B in FIG. 3.
Figure 6:
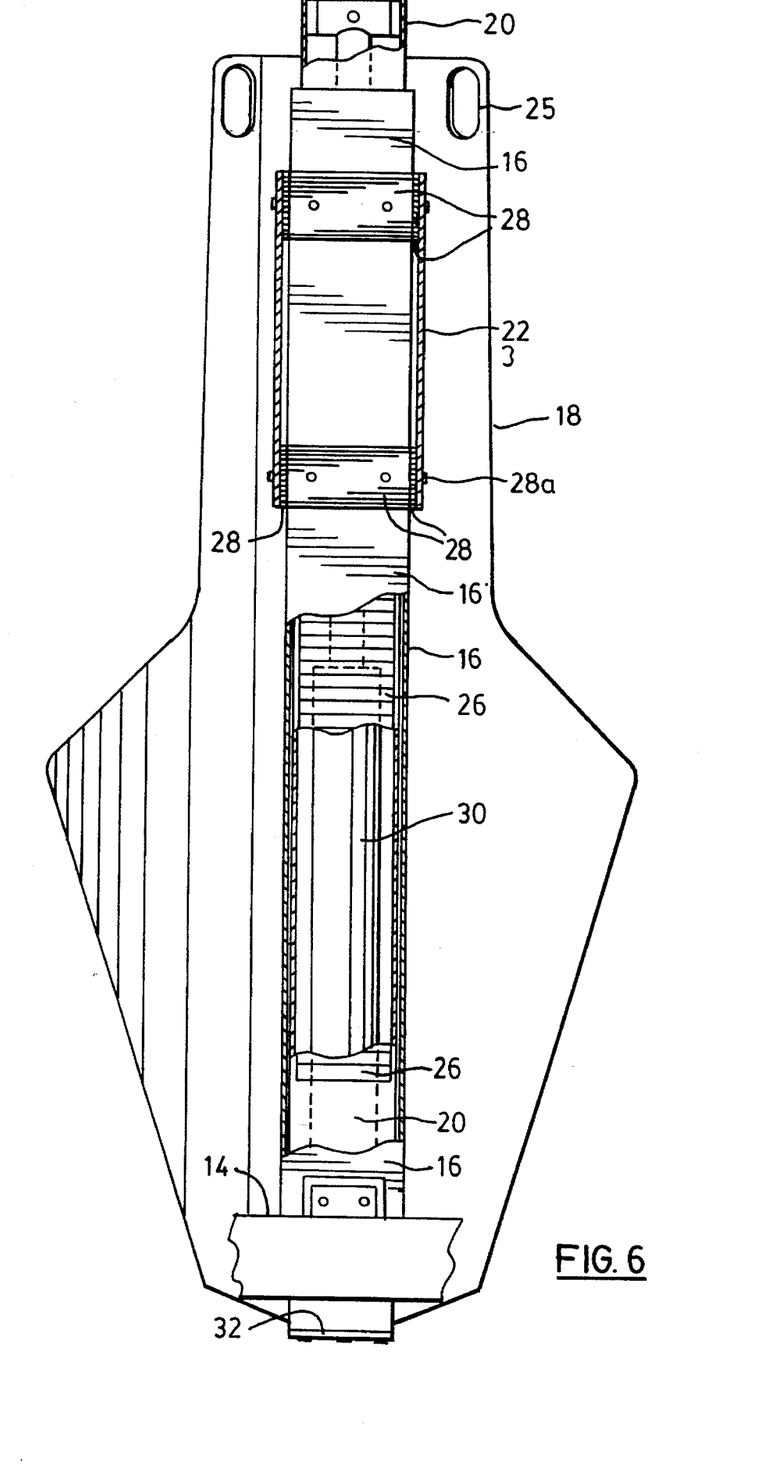
FIG. 6 is an inside elevational view of the tower and sliding spade assembly in the inside-frame embodiments of the apparatus illustrated in FIG. 1, FIG. 2 and FIG. 2B seen from the concave side of the spade in the direction indicated by arrow I in FIG. 3.

As best seen in FIGS. 3 and 6, the bottom end of tower 16 is preferably covered by a cover plate 32 bolted to the bottom of the tower, which is contoured along its edge to conform to the curvature of blade 18a to prevent debris from entering the tower. As best seen in FIG. 5, providing an axial view from the bottom of the tower, there may also advantageously be welded to the back of tower 16, near the bottom thereof, a V-shaped scraper plate 34 which wipes dirt from the blade surface when it is being retracted.

Although the invention has been described with respect to a preferred embodiment, it will be appreciated that it is not to be limited thereby, since modifications can be made thereto which are within the scope of the invention as defined by the appended claims and equivalents thereof.

We claim:

1. An apparatus for digging and transplanting trees comprising:

(a) a multi-sided frame for encircling a tree to be transplanted when disposed horizontally to the ground;

(b) a plurality of towers mounted on said frame and extending angularly upwardly therefrom, each said tower being in the form of a first channel open along one side;

(c) a removable sliding spade assembly for each of said towers, including a spade blade having a lower digger portion and an integral upper stem portion of generally the same length, a hollow thrust tube welded along one side thereof centrally to said stem portion and being of a cross-sectional shape for accommodation within said open channel of the tower, and a slide housing in the form of a second channel, larger than said first channel, embracing a section of said thrust tube in spaced relation thereto and welded to said stem portion of the blade so that a sliding spade assembly channel is formed between said thrust tube and said slide housing for telescopically receiving the wall of said first channel of said tower between the outer surface of said thrust tube and the inner surface of said second channel for reciprocating movement of the sliding spade assembly relative to the tower; and (d) power means for actuating said sliding spade assembly for reciprocating movement along said tower.

2. An apparatus for digging and transplanting trees according to claim 1, wherein said first channel and said second channel are rectangular in cross-sectional shape and said hollow thrust tube is of a generally square configuration on said other sides thereof.

3. An apparatus for digging and transplanting trees according to claim 2, wherein high molecular-weight, low-friction plastic linings are affixed to the surface of said tower within said first rectangular channel and to the surfaces of said slide housing within said second rectangular channel.

4. An apparatus for digging and transplanting trees according to claim 3, wherein said power means comprises hydraulic actuating means located in the hollow interior of said thrust tube and operatively connected to the top of the thrust tube and to said tower at a position below said frame.

5. An apparatus for digging and transplanting trees according to claim 3, wherein said spade blades are convexly curved and formed with a medial fold line along the length thereof, so that the lower digger portion of each said spade blade presents a convex outer surface and a concave inner surface.

6. An apparatus for digging and transplanting trees according to claim 5, wherein the degree of curvature of each said spade blade decreases outwardly from said medial fold line.

7. An apparatus for digging and transplanting trees according to claim 6, further comprising a cover plate affixed across the bottom opening of said tower to prevent entry of debris during a digging operation.

8. An apparatus for digging and transplanting trees according to claim 7, further comprising a V-shaped scraper plate affixed to the back of said tower at the bottom thereof in close proximity to the concave inner surface of said digger portion of the blade when said sliding spade assembly is installed on the tower.

* * * * *